(12) United States Patent
Huang

(10) Patent No.: US 11,293,810 B2
(45) Date of Patent: Apr. 5, 2022

(54) LINEAR CONTROL CIRCUIT AND METHOD THEREOF

(71) Applicant: ZyXEL Communications Corp., New Taipei (TW)

(72) Inventor: Chung-Hsien Huang, Hsinchu (TW)

(73) Assignee: ZyXEL Communications Corp., New Taipei (TW)

( * ) Notice: Subject to any disclaimer, the term of this patent is extended or adjusted under 35 U.S.C. 154(b) by 325 days.

(21) Appl. No.: 16/510,994

(22) Filed: Jul. 15, 2019

(65) Prior Publication Data
US 2020/0173864 A1    Jun. 4, 2020

(30) Foreign Application Priority Data
Dec. 4, 2018 (CN) .......................... 201811472681.6

(51) Int. Cl.
*G01K 7/22* (2006.01)

(52) U.S. Cl.
CPC ...................................... *G01K 7/22* (2013.01)

(58) Field of Classification Search
None
See application file for complete search history.

(56) References Cited

U.S. PATENT DOCUMENTS

2013/0120930 A1 * 5/2013 Temkine .................. G01K 7/01
361/679.47

FOREIGN PATENT DOCUMENTS

| CA | 2497630 A1 * | 11/2005 | ............... G01N 1/24 |
|---|---|---|---|
| CN | 2375031 | 4/2000 | |
| CN | 101430570 | 5/2009 | |
| CN | 104343714 | 2/2015 | |
| CN | 204200638 | 3/2015 | |
| CN | 207195269 | 4/2018 | |
| JP | H0731190 | 1/1995 | |

OTHER PUBLICATIONS

Office Action of China Counterpart Application, dated Apr. 12, 2021, pp. 1-6.

* cited by examiner

*Primary Examiner* — Erica S Lin
(74) *Attorney, Agent, or Firm* — JCIPRNET

(57) ABSTRACT

The present invention provides a linear control circuit for controlling an external device. The linear control circuit includes a temperature sensor and a controller. The temperature sensor is configured to sense a temperature. The controller is electrically coupled to the external device and the temperature sensor, and configured to provide a linear control signal associated with a control parameter value according to a sensing result in response to the temperature and linearly control the rotational speed of the external device by the linear control signal.

14 Claims, 4 Drawing Sheets

LINEAR CONTROL CIRCUIT AND METHOD THEREOF

CROSS REFERENCE TO RELATED APPLICATION

This application claims the priority benefit of China application serial no. 201811472681.6, filed on Dec. 4, 2018. The entirety of the above-mentioned patent application is hereby incorporated by reference herein and made a part of specification.

BACKGROUND OF THE INVENTION

1. Field of the Invention

The present invention relates to a control circuit and a control method thereof, in particular, to a linear control circuit for controlling an external device and a linear control method thereof.

2. Description of Related Art

A system usually requires heat dissipation when it's overtemperature. To meet this requirement, a heat sink is desired. Nevertheless, the heat sink generates disturbing noise when it is started up. A system is not in the high-power-consumption and high-temperature application environment all the time. To adjust the rotational speed of a fan according to the temperature change, most of existing circuit designs use a control integrated circuit which brings on high costs and need software for detection and control, or use a comparator for temperature segmentation control only. However, the above control method causes disturbing noise.

SUMMARY OF THE INVENTION

The present invention is directed to a control circuit and a control method thereof, which can linearly control the rotational speed of an external device according to the temperature change, so as to reduce disturbing noise generated when the external device is started up or stopped.

According to an embodiment of the present invention, a linear control circuit is used for controlling an external device. The linear control circuit includes a temperature sensor and a controller. The temperature sensor is configured to sense a temperature. The controller is electrically coupled to the external device and the temperature sensor. The controller is configured to provide a linear control signal associated with a control parameter value according to a sensing result in response to the temperature, so as to linearly control the rotational speed of the external device.

In an embodiment of the present invention, the controller is further configured to provide a reference voltage and perform a gain of the control parameter on the reference voltage to provide the linear control signal.

In an embodiment of the present invention, the controller has a first input terminal, a second input terminal and an output terminal, the first input terminal is configured to receive a direct-current input voltage to cause the controller to be driven, the second input terminal is configured to receive the sensing result, the output terminal is electrically coupled to the external device, and the output terminal is configured to provide the linear control signal.

In an embodiment of the present invention, the temperature sensor includes a thermistor and a reference resistor. A first end of the thermistor is electrically coupled to the output terminal. A second end of the thermistor is electrically coupled to the second input terminal. A first end of the reference resistor is electrically coupled to the second end of the thermistor. The second end of the reference resistor is electrically coupled to a low power source.

In an embodiment of the present invention, the controller obtains the control parameter value according to a resistance value of the thermistor and a resistance value of the reference resistor.

In an embodiment of the present invention, the operation result computed by the controller is the resistance value of the reference resistor divided by the resistance value of the thermistor, then, adds one to the operation result can obtain the control parameter value.

In another embodiment of the present invention, the operation result computed by the controller is the resistance value of the thermistor divided by the resistance value of the reference resistor, then adds one to the operation result to obtain the control parameter value.

In an embodiment of the present invention, the external device includes at least one fan.

In an embodiment of the present invention, the rotational speed of the fan is in direct proportion to a voltage value of the linear control signal.

According to an embodiment of the present invention, a linear control method applied to a linear control circuit for controlling an external device, including: providing a linear control signal associated with a control parameter value according to a sensing result in response to the temperature; and linearly controlling the rotational speed of the external device by the linear control signal.

In an embodiment of the present invention, the step of providing the linear control signal associated with the control parameter value according to the sensing result in response to the temperature includes: providing a reference voltage, and performing a gain of the control parameter on the reference voltage to provide the linear control signal.

In an embodiment of the present invention, the linear control circuit includes a temperature sensor and a controller, the controller has a first input terminal, a second input terminal and an output terminal, the first input terminal is configured to receive a direct-current input voltage to cause the controller to be driven, the second input terminal is configured to receive the sensing result, the output terminal is electrically coupled to the external device, the output terminal is configured to provide the linear control signal. The temperature sensor includes a thermistor and a reference resistor, a first end of the thermistor is electrically coupled to the output terminal, a second end of the thermistor is electrically coupled to the second input terminal, a first end of the reference resistor is electrically coupled to the second end of the thermistor, and the second end of the reference resistor is electrically coupled to a low power source. The step of providing the linear control signal associated with the control parameter value according to the sensing result in response to the temperature includes: obtaining the control parameter value according to the resistance value of the thermistor and the resistance value of the reference resistor.

In an embodiment of the present invention, the step of providing the linear control signal associated with the control parameter value according to the sensing result in response to the temperature further includes: dividing the resistance value of the reference resistor by the resistance value of the thermistor to obtain an operation result; and adding one to the operation result to obtain the control parameter value.

In an embodiment of the present invention, the step of providing the linear control signal associated with the control parameter value according to the sensing result in response to the temperature further includes: dividing the resistance value of the thermistor by the resistance value of the reference resistor to obtain an operation result; and adding one to the operation result to obtain the control parameter value.

Based on the above, in the present invention, the linear control signal associated with the control parameter value is provided according to the sensing result in response to the temperature, and the rotational speed of the external device is linearly controlled by the linear control signal. In this way, the present invention can linearly control the rotational speed of the external device according to the temperature change, reduce disturbing noise generated when the external device is started up or stopped by the non-breaking linear control, and can improve the energy consumption and noise caused by the long-time and high-speed operation.

In order to make the aforementioned and other objectives and advantages of the present invention comprehensible, embodiments accompanied with figures are described in detail below.

DESCRIPTION OF THE EMBODIMENTS

Figure 1:
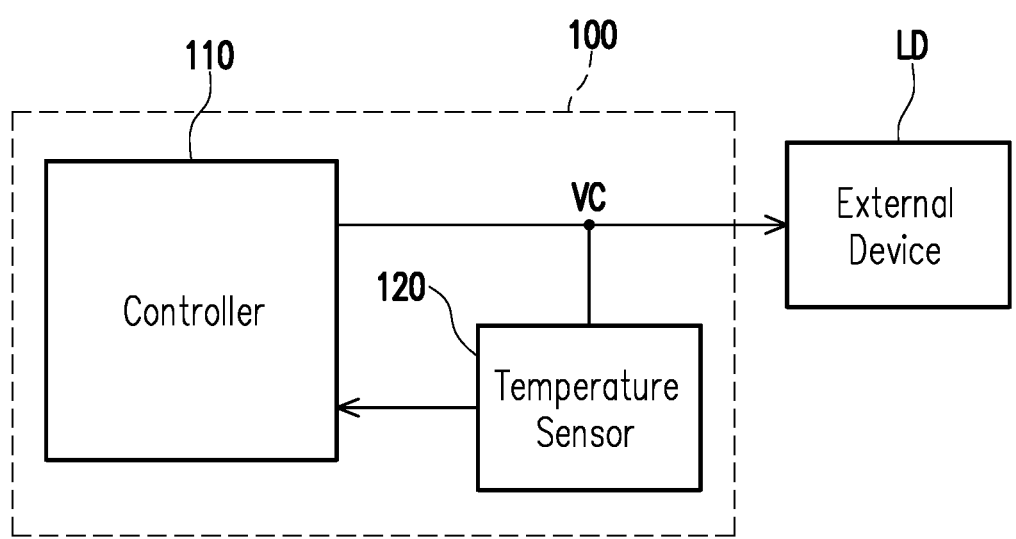
FIG. 1 is a schematic diagram of a linear control circuit and an external device according to an embodiment of the present invention.

In order to make the content of the present invention easier to understand, the following specific embodiments are illustrative of the actual implementation of the present invention. In addition, wherever possible, the same reference numbers of components/members/steps are used in the drawings and implementations to represent the same or similar components.

Referring to FIG. 1, FIG. 1 is a schematic diagram of a linear control circuit and an external device according to an embodiment of the present invention. In the present embodiment, the linear control circuit 100 is configured to control an external device LD. The linear control circuit 100 includes a temperature sensor 120 and a controller 110. The temperature sensor 120 is configured to sense a temperature. The controller 110 is electrically coupled to the external device LD and the temperature sensor 120. The controller 110 is configured to provide a linear control signal VC associated with a control parameter value by a sensing result ST, responding to temperature, of the temperature sensor 120 and linearly control the external device LD by the linear control signal VC. In the present embodiment, the linear control circuit 100 determines the rotational speed of the external device LD according to the temperature sensed by the temperature sensor 120. In the present embodiment, the external device LD is a device having an electric motor, for example, at least one fan.

Figure 2:
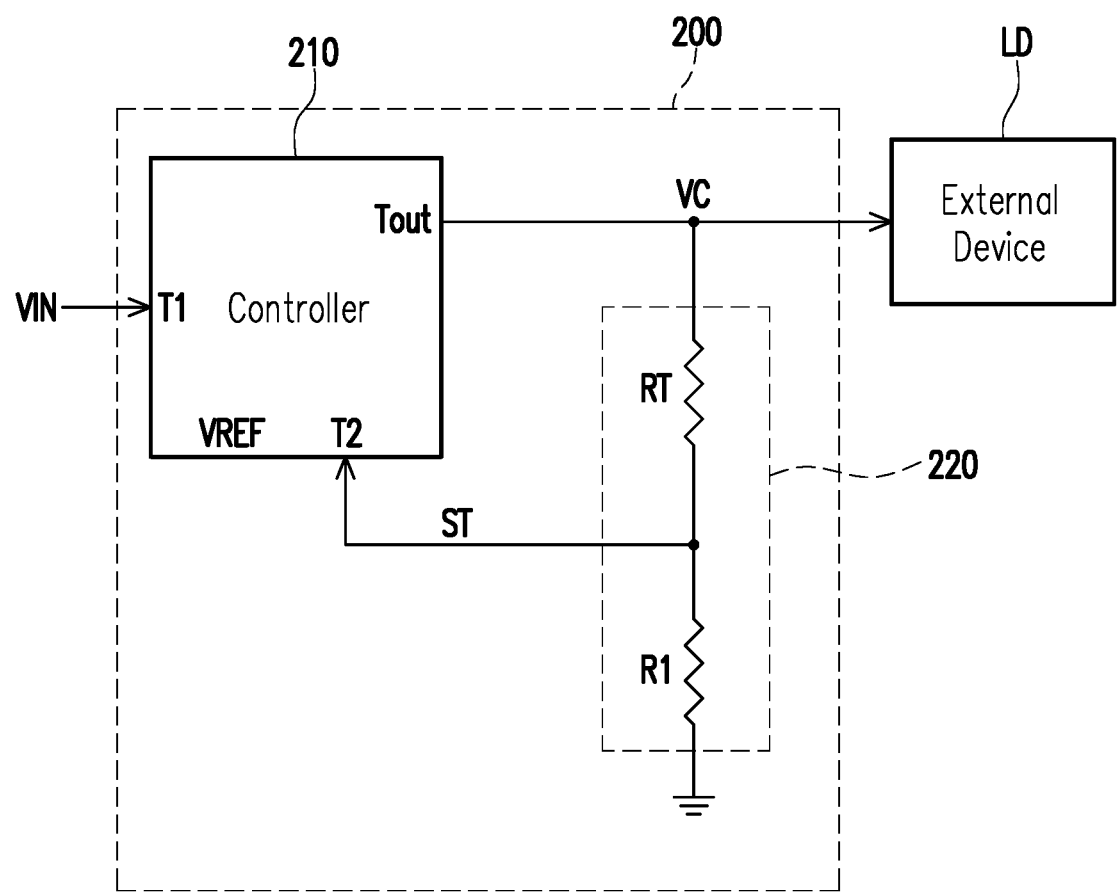
FIG. 2 is a schematic diagram of a linear control circuit and an external device according to another embodiment of the present invention.

For further explanation, referring to FIG. 2, FIG. 2 is a schematic diagram of a linear control circuit and an external device according to another embodiment of the present invention. In the present embodiment, the linear control circuit 200 includes a temperature sensor 220 and a controller 210. The controller 210 has a first input terminal T1, a second input terminal T2 and an output terminal Tout. The first input terminal T1 of the controller 210 is configured to receive a direct-current input voltage VIN such that the controller 210 was driven. The second input terminal T2 of the controller 210 is configured to receive a sensing result ST from the temperature sensor 220. The output terminal Tout of the controller 210 is electrically coupled to the external device LD. The output terminal Tout of the controller 210 is configured to provide the linear control signal VC to the external device LD. In the present embodiment, the temperature sensor 220 includes a thermistor RT and a reference resistor R1. A first end of the thermistor RT is electrically coupled to the output terminal Tout of the controller 210. A second end of the thermistor RT is electrically coupled to the second input terminal T2. A first end of the reference resistor R1 is electrically coupled to the second end of the thermistor RT. The second end of the reference resistor R1 is electrically coupled to a low power source, for example, a ground or negative charge terminal.

In the present embodiment, the reference resistor R1 is a resistor having a fixed resistance value. The thermistor RT is a negative temperature coefficient resistor, so when the temperature of the environment rises, the resistance value of the thermistor RT decreases. Conversely, when the temperature of the environment decreases, the resistance value of the thermistor RT rises. Therefore, the temperature sensor 220 calculates the resistance value of the thermistor RT and the resistance value of the reference resistor R1 as the sensing result ST. The temperature sensor 220 provides the sensing result ST to the second input terminal T2 of the controller 210.

The controller 210 receives the sensing result ST through the second input terminal T2, and provides a corresponding linear control signal VC according to the sensing result ST. That is, the controller 210 obtains the control parameter value according to the resistance value of the thermistor RT and the resistance value of the reference resistor R1. For example, an operation result is the resistance value of the reference resistor R1 divides by the resistance value of the thermistor RT, and adds one to the operation result to obtain the control parameter value, and the control parameter values can be as shown in Equation (1):

$$CP1 = 1 + (r\_R1 / r\_RT) \quad (1)$$

Where CP1 is the control parameter value, r_R1 is the resistance value of the reference resistor R1, and r_RT is the resistance value of the thermistor RT.

In the present embodiment, the controller 210 further provides a reference voltage VREF. The reference voltage VREF may be a signal having a fixed voltage value. After the controller 210 obtains the control parameter value, the controller 210 performs a gain of the control parameter value on the reference voltage VREF to provide the linear control signal VC. That is, the voltage value of the linear control signal VC has a multiple relationship of the control parameter value with respect to the voltage value of the reference voltage VREF. The voltage value of the linear control signal VC can be as shown in Equation (2):

$$v\_VC1 = CP1 \times v\_VREF \quad (2)$$

Where v_VC1 is the voltage value of the linear control signal VC, and v_VREF is the voltage value of the reference voltage VREF. Therefore, when the temperature rises, the resistance value of the thermistor RT decreases, so that the control parameter value rises, and thus the voltage value of the linear control signal VC correspondingly rises. On the other hand, when the temperature decreases, the resistance value of the thermistor RT rises, so that the control parameter value decreases, and thus the voltage value of the linear control signal VC correspondingly decreases. In the present embodiment, the controller 210 may be an arithmetic circuit that can support the Equation (1) and Equation (2) described above. For example, controller 210 may be a device that at least includes a low-dropout regulator (LDO) or a linear voltage regulator. Therefore, the linear control circuit 200 may not need to be implemented by a complex device (e.g., a microprocessor) or software. As such, the cost of the linear control circuit 200 can be reduced.

After providing the linear control signal VC associated with the control parameter value according to the sensing result ST in response to temperature, the controller 210 linearly controls the rotational speed of the LD by the linear control signal VC. In the present embodiment, the rotational speed of the external device LD is set to be in direct proportion to the voltage value of the linear control signal VC. That is, as the temperature rises, the voltage value of the linear control signal VC rises, so the rotational speed of the external device LD also rises. Conversely, as the temperature decreases, the voltage value of the linear control signal VC decreases, and the rotational speed of the external device LD also decreases. The controller 210 can linearly control the rotational speed of the external device LD by the linear control signal VC. In this way, the linear control circuit 200 can linearly control the rotational speed of the external device LD according to the temperature change, so as to reduce disturbing noise generated by the external device LD when the rotational speed is started up or stopped by the non-breaking linear control.

The maximum voltage value and the minimum voltage value of the linear control signal VC may be set, and the external device LD provides the maximum rotational speed based on the maximum voltage value of the linear control signal VC while the external device LD provides the minimum rotational speed based on the minimum voltage value of the linear control signal VC. For example, the direct-current input voltage VIN is 12 V. The maximum voltage value of the linear control signal VC is set to 11 V, and the minimum voltage value of the linear control signal VC is set to 2 V. Therefore, the external device LD can provide the maximum rotational speed when the voltage value of the linear control signal VC is 11 V. The external device LD can also provide the minimum rotational speed when the voltage value of the linear control signal VC is 2 V, and the minimum voltage value of the linear control signal VC can be regarded as the minimum driving voltage of the external device LD.

When the controller 210 controls the external device LD by the maximum voltage value of the linear control signal VC, the controller 210 and the external device LD generate a maximum current value, for example, 200 mA. When the controller 210 controls the external device LD by the maximum voltage value (11 V) of the linear control signal VC, the controller 210 has a voltage difference of 1 V, i.e., a voltage difference between the direct-current input voltage VIN and the linear control signal VC. Thus the power consumption produced by the controller 210 is equivalent to the product of 1 V and 200 mA, which is 0.2 W.

On the other hand, when the controller 210 controls the external device LD by the minimum voltage value of the linear control signal VC, the controller 210 and the external device LD generate a minimum current value, for example, 20 mA. When the controller 210 controls the external device LD by the minimum voltage value (2 V) of the linear control signal VC, the controller 210 has a voltage difference of 10 V, i.e., a voltage difference between the direct-current input voltage VIN and the linear control signal VC. Thus the power consumption produced by the controller 210 is equivalent to the product of 10 V and 20 mA, which is 0.2 W.

It is worth mentioning that, in the present embodiment, when the external device LD is subjected to the non-breaking linear control, whether the controller 210 controls the external device LD by the maximum voltage value of the linear control signal VC or by the minimum voltage value of the linear control signal VC, the power consumption can be maintained in a specific power range. Thus, during the linear control on the external device LD by the linear control circuit 200, the controller 210 has substantially the same or similar power consumption while providing different voltage values of the linear control signal VC. Therefore, there is no significant change in the power that the controller 210 is subjected to, thereby increasing the service life of the controller 210.

In addition, when the linear control circuit 200 controls the external device LD, for example, at a higher temperature, the increased power of the abovementioned calculation is almost transferred to the external device LD. Therefore, the linear control circuit 200 can further ensure that the rotational speed of the external device LD can be in direct proportion to the voltage value of the linear control signal VC.

Figure 3:
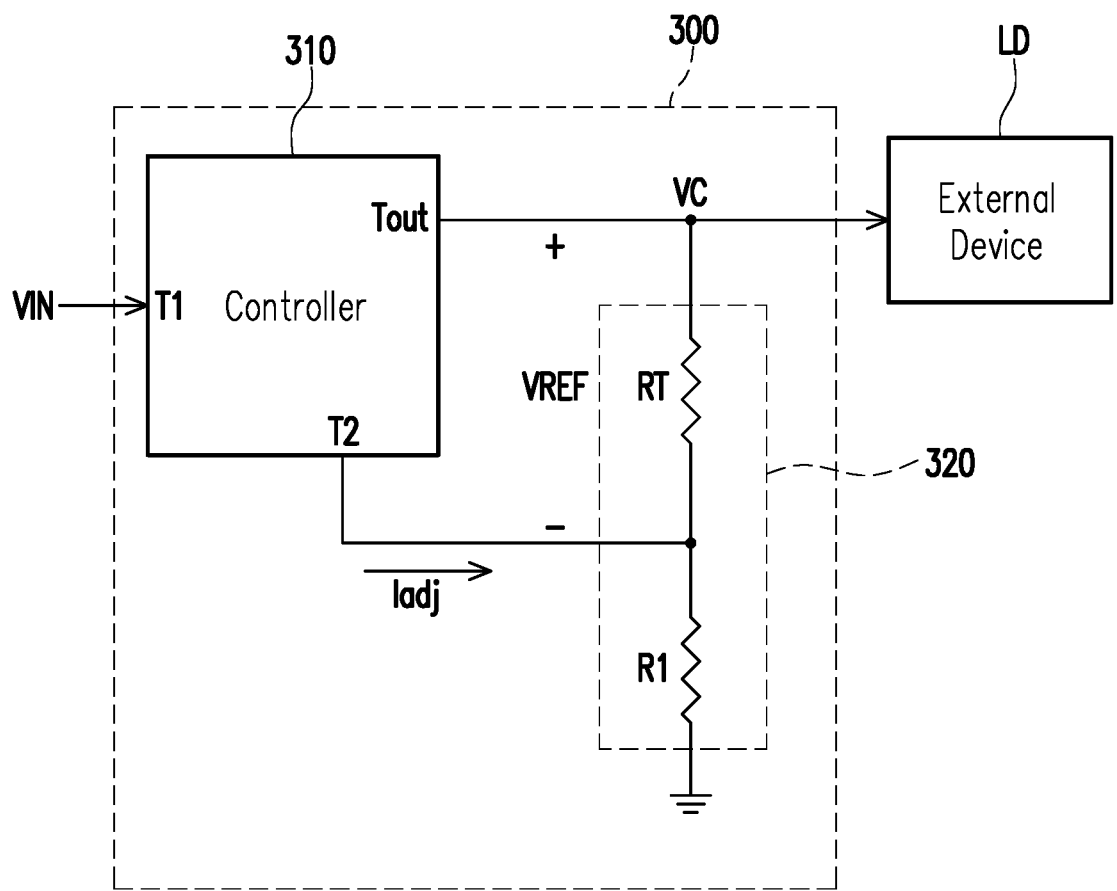
FIG. 3 is a schematic diagram of a linear control circuit and an external device according to still another embodiment of the present invention.

Referring to FIG. 3, FIG. 3 is a schematic diagram of a linear control circuit and an external device according to still another embodiment of the present invention. The linear control circuit 300 is applicable as the linear control circuit 100 of the embodiment of FIG. 1. In the present embodiment, the linear control circuit 300 includes a controller 310 and a temperature sensor 320. The controller 310 has a first input terminal T1, a second input terminal T2 and an output terminal Tout. The first input terminal T1 of the controller 310 is configured to receive a direct-current input voltage VIN such that the controller 310 receives the direct-current input voltage VIN so as to be driven. The output terminal Tout of the controller 310 is electrically coupled to the external device LD. The output terminal Tout of the controller 310 is configured to provide the linear control signal VC to the external device LD. In the present embodiment, the temperature sensor 320 includes a thermistor RT and a reference resistor R1. A first end of the thermistor RT is electrically coupled to the output terminal Tout of the controller 310. A second end of the thermistor RT is electrically coupled to the second input terminal T2. A first end of the reference resistor R1 is electrically coupled to the second end of the thermistor RT. The second end of the reference resistor R1 is electrically coupled to a low power source, for example, a ground or negative charge terminal.

In the present embodiment, the controller 310 obtains the control parameter value according to the resistance value of the thermistor RT and the resistance value of the reference resistor R1. The controller 310 is configured to maintain the voltage value at the first end of the thermistor RT and the voltage value at the second end of the thermistor RT at the reference voltage VREF. The voltage value at the first end of the thermistor RT is greater than the voltage value at the second end of the thermistor RT. The resistance value of the thermistor RT can be changed according to the temperature change, so as to change the value of the current flowing through the thermistor RT. Further, the value of the current flowing through the thermistor RT enters the reference resistor R1 such that the voltage difference between the first end and the second end of the reference resistor R1 changes, thereby adjusting the voltage value of the linear control signal VC.

For example, when the temperature rises, the resistance value of the thermistor RT decreases, and thus the value of the current flowing through the thermistor RT rises. The value of the current flowing through the thermistor RT enters the reference resistor R1, so as to increase the voltage difference between the first end and the second end of the reference resistor R1, thus the voltage value of the first end of the reference resistor R1 (i.e., the second end of the thermistor RT) is raised, thereby raising the voltage value of the linear control signal VC. Conversely, when the temperature decreases, the resistance value of the thermistor RT rises, so the value of the current flowing through the thermistor RT decreases. The value of the current flowing through the thermistor RT enters the reference resistor R1, so as to reduce the voltage difference between the first end and the second end of the reference resistor R1, thus the voltage value of the first end of the reference resistor R1 (i.e., the second end of the thermistor RT) is lowered, thereby lowering the voltage value of the linear control signal VC.

Therefore, the control parameter value can be as shown in Equation (3):

$$CP2 = 1 + (r\_RT / r\_R1) \quad (3)$$

Where CP2 is the control parameter value, r_R1 is the resistance value of the reference resistor R1, and r_RT is the resistance value of the thermistor RT. That is, based on maintaining the voltage value at the first end of the thermistor RT and the voltage value at the second end of the thermistor RT at the reference voltage VREF, an operation result made by the controller 310 is the resistance value of the thermistor RT divide by the resistance value of the reference resistor R1, and add one to the operation result to obtain the control parameter value.

The controller 310 performs a gain of the control parameter value on the reference voltage to provide the linear control signal VC. That is, the voltage value of the linear control signal VC has a multiple relationship of the control parameter value with respect to the voltage value of the reference voltage. The voltage value of the linear control signal VC can be as shown in Equation (4):

$$v\_VC2 = CP2 \times v\_VREF \quad (4)$$

Where v_VC2 is the voltage value of the linear control signal VC, and v_VREF is the voltage value of the reference voltage.

In addition, in some embodiments, the controller 310 may also provide an adjustment current Iadj and adjust the linear control signal VC according to the current value of the adjustment current Iadj and the resistance value of the reference resistor R1. The adjustment of the voltage value of the linear control signal VC can be as shown in Equation (5):

$$v\_VC2 = CP2 \times v\_VREF + i\_Iadj \times r\_R1 \quad (5)$$

Where i_Iadj is the current value of the adjustment current Iadj, and the current value of the adjustment current Iadj may be a real number greater than 0 or less than 0. For example, if the adjustment current Iadj is a current flowing from the second input terminal T2 to the first end of the reference resistor R1, the current value of the adjustment current Iadj is a real number greater than 0. Conversely, if the adjustment current Iadj is a current flowing from the first end of the reference resistor R1 to the second input terminal T2, the current value of the adjustment current Iadj is a real number less than 0. Therefore, the controller 310 can adjust the voltage value of the linear control signal VC based on the adjustment current Iadj, so as to adjust the linearity error between the voltage value of the linear control signal VC and the rotational speed of the external device.

Figure 4:
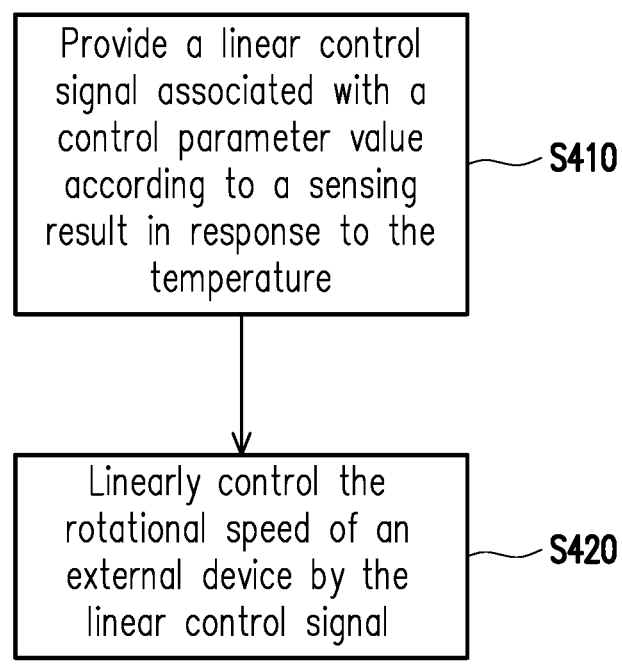
FIG. 4 is a flow chart of a linear control method according to an embodiment of the present invention.

Referring to FIG. 1 and FIG. 4, FIG. 4 is a flow chart of a linear control method according to an embodiment of the present invention. The linear control method can be applied to the embodiments of FIG. 1, FIG. 2 and FIG. 3. The linear control method includes the following steps that firstly, in step S410, the linear control circuit 100 provides a linear control signal VC associated with the control parameter value in response to a sensing result ST of temperature by the temperature sensor. Then, in step S420, the linear control circuit 100 linearly controls the rotational speed of the external device LD by the linear control signal VC. Regarding the implementation details of the linear control method described above, sufficient teachings can be obtained from the embodiments of FIG. 1, FIG. 2 and FIG. 3, and thus the descriptions thereof are omitted herein.

Based on the above, in the present invention, the linear control signal associated with the control parameter value is provided in response to the temperature sensing result, and the rotational speed of the external device is linearly controlled by the linear control signal. In this way, the present invention can linearly control the rotational speed of the external device according to the temperature change, so as to reduce disturbing noise generated when the external device is started up or stopped by the non-breaking linear control. The linear control circuit of the present invention may not need to be implemented by a complex device or software. As such, the cost of the linear control circuit can be reduced. During the linear control on the external device by the linear control circuit, the controller has substantially the same or similar power consumption while providing different voltage values of the linear control signal. Therefore, there is no significant change in the power that the controller is subjected to, thereby increasing the service life of the controller, and further ensuring that the rotational speed of the external device can be in direct proportion to the voltage value of the linear control signal.

Finally, it should be noted that the above embodiments are only used to illustrate the technical solutions of the present invention, and are not limited thereto. Although the present invention has been described in detail with reference to the foregoing embodiments, a person of ordinary skill in the art should understand that the technical solutions described in the foregoing embodiments may be modified or some or all of the technical features may be equivalently substituted. These modifications and substitutions do not depart from the scope of the technical solutions of the embodiments of the present invention.

What is claimed is:

1. A linear control circuit for controlling an external device, comprising:
a temperature sensor, configured to sense a temperature; and
a controller, electrically coupled to the external device and the temperature sensor, and configured to provide a linear control signal associated with a control parameter value according to a sensing result in response to the temperature, adjust a voltage value of the linear control signal by an adjustment current, and linearly control a rotational speed of the external device by the voltage value of the linear control signal after being adjusted, wherein the adjustment current is used to adjust a linearity error between the voltage value of the linear control signal and the rotational speed of the external device.

2. The linear control circuit according to claim 1, wherein the controller is further configured to provide a reference voltage and multiply perform a gain of the control parameter value on the reference voltage to provide the linear control signal.

3. The linear control circuit according to claim 1, wherein the controller comprises a first input terminal, a second input terminal and an output terminal, the first input terminal is configured to receive a direct-current input voltage to cause the controller to be driven, the second input terminal is configured to receive the sensing result, the output terminal is electrically coupled to the external device, and the output terminal is configured to provide the linear control signal.

4. The linear control circuit according to claim 3, wherein the temperature sensor comprises:
a thermistor, a first end of the thennistor being electrically coupled to the output terminal, and a second end of the thermistor being electrically coupled to the second input terminal; and
a reference resistor, a first end of the reference resistor being electrically coupled to the second end of the thermistor, and the second end of the reference resistor being electrically coupled to a low power source.

5. The linear control circuit according to claim 4, wherein the controller obtains the control parameter value according to a resistance value of the thermistor and a resistance value of the reference resistor.

6. The linear control circuit according to claim 4, wherein the controller divides the resistance value of the reference resistor by the resistance value of the thermistor to obtain an operation result, and adds 1 to the operation result to obtain the control parameter value.

7. The linear control circuit according to claim 4, wherein the controller divides the resistance value of the thermistor by the resistance value of the reference resistor to obtain an operation result, and adds 1 to the operation result to obtain the control parameter value.

8. The linear control circuit according to claim 1, wherein the external device comprises at least one fan.

9. The linear control circuit according to claim 8, wherein the rotational speed of the fan is in direct proportion to a voltage value of the linear control signal.

10. A linear control method applied to a linear control circuit for controlling an external device, wherein the linear control method comprises:
providing a linear control signal associated with a control parameter value according to a sensing result in esponse to the temperature;
adjusting a voltage value of the linear control signal by an adjustment current; and
linearly controlling a rotational speed of the external device by the voltage value of the linear control signal after being adjusted,
wherein the adjustment current is used to adjust a linearity error between the voltage value of the linear control signal and the rotational speed of the external device.

11. The linear control method according to claim 10, wherein the step of providing the linear control signal associated with the control parameter value according to the sensing result in response to the temperature comprises:
providing a reference voltage, and performing a gain of the control parameter value on the reference voltage to provide the linear control signal.

12. The linear control method according to claim 10, wherein the linear control circuit comprises a temperature sensor and a controller, the controller comprises a first input terminal, a second input terminal and an output terminal, the first input terminal is configured to receive a direct-current input voltage to cause the controller to be driven, the second input terminal is configured to receive the sensing result, the output terminal is electrically coupled to the external device, the output terminal is configured to provide the linear control signal, the temperature sensor comprises a thermistor and a reference resistor, a first end of the thermistor is electrically coupled to the output terminal, a second end of the thennistor is electrically coupled to the second input terminal, a first end of the reference resistor is electrically coupled to the second end of the thermistor, and the second end of the reference resistor is electrically coupled to a low power source, wherein the step of providing the linear control signal associated with the control parameter value according to the sensing result in response to the temperature comprises:
obtaining the control parameter value according to the resistance value of the thermistor and the resistance value of the reference resistor.

13. The linear control method according to claim 12, wherein the step of providing the linear control signal associated with the control parameter value according to the sensing result in response to the temperature further comprises:
dividing the resistance value of the reference resistor by the resistance value of the thermistor to obtain an operation result; and
adding 1 to the operation result to obtain the control parameter value.

14. The linear control method according to claim 12, wherein the step of providing the linear control signal associated with the control parameter value according to the sensing result in response to the temperature further comprises:
dividing the resistance value of the thermistor by the resistance value of the reference resistor to obtain an operation result; and
adding 1 to the operation result to obtain the control parameter value.

* * * * *